Aug. 7, 1923.

C. F. RODIN 1,464,341

SPRING SHACKLE MOUNTING

Filed April 12, 1922    2 Sheets-Sheet 1

INVENTOR.
CHARLES F. RODIN.
BY
ATTORNEYS.

Aug. 7, 1923.

C. F. RODIN

SPRING SHACKLE MOUNTING

Filed April 12, 1922

INVENTOR.
CHARLES F. RODIN
BY Dewey, Strong
Townsend & Loftus
ATTORNEYS

Patented Aug. 7, 1923.

1,464,341

UNITED STATES PATENT OFFICE.

CHARLES F. RODIN, OF FAIRFAX, CALIFORNIA.

SPRING SHACKLE MOUNTING.

Application filed April 12, 1922. Serial No. 551,815.

*To all whom it may concern:*

Be it known that I, CHARLES F. RODIN, a citizen of the United States, residing at Fairfax, county of Marin, and State of California, have invented new and useful Improvements in Spring Shackle Mountings, of which the following is a specification.

This invention relates to a spring shackle and especially to a compound type of shackle link adapted to be interposed between the main frame and the springs of a motor driven vehicle.

The object of the present invention is to generally improve and simplify the construction of devices of the character described; to provide a shackle link which may be readily attached to any motor vehicle without changing the frame or spring ends, or in any way altering the spring mounting; to provide a shackle link of the compound type adapted to be interposed between the main frame and the springs of a motor vehicle or the like, and to so dispose the links that free downward movement of the frame and body during compression of the springs is permitted, while quick or sudden rebound movement will be practically prevented; and further to provide means for adjusting the angle of the links with relation to the springs and the frame. Other objects will hereinafter appear.

The invention consists of the parts and the construction, combination and arrangement of parts as hereinafter more fully described and claimed, having reference to the accompanying drawings, in which—

Fig. 4 is a modified form of the compound shackle showing it attached to a transverse spring mounting such as employed by Ford automobiles and the like.

Figure 1:
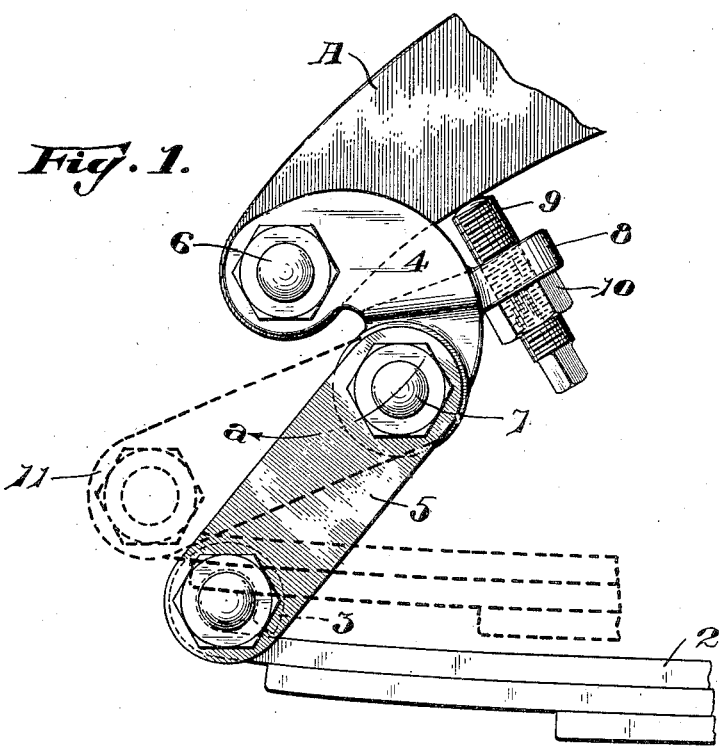
Fig. 1 is a side elevation of the rear end of a motor vehicle showing the main frame, the springs and the compound shackle connecting the same.
Figure 2:
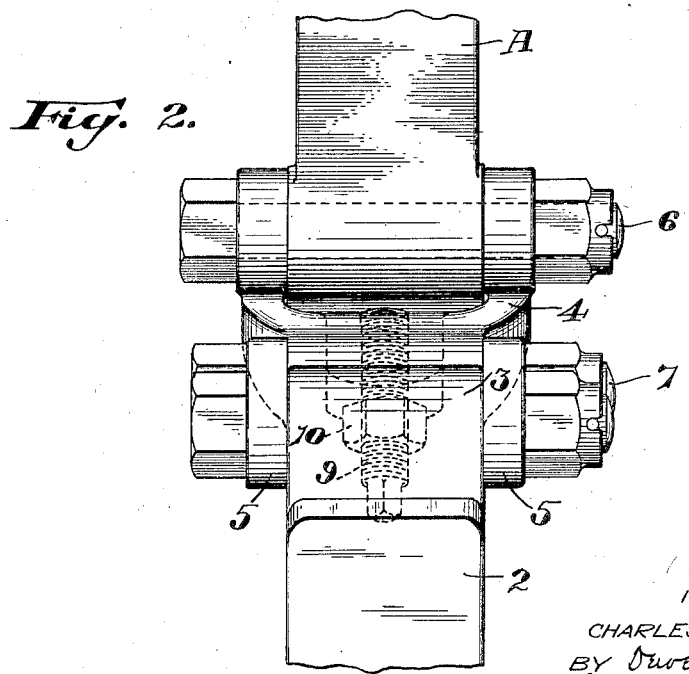
Fig. 2 is an end view of Fig. 1.

Referring to the drawings in detail, and particularly to Figs. 1 and 2, A indicates the rear end of the main frame of a motor vehicle or the like, and 2 the rear end of a semielliptical spring mounting. Interposed between the main frame and the eye of the spring, indicated at 3, is a compound shackle member consisting of a link 4 and a second link 5. The upper link 4 is pivotally attached to the end of the frame in any suitable manner as indicated at 6, and the opposite or lower end of this link is provided with a pivot point to which the upper end of the link 5 is pivotally secured in any suitable manner. The lower end of the link 5 is directly attached to the eye 3 of the spring and pivots with relation thereto. Ordinary shackle bolts may be employed as pivotal connections in each instance and these may be constructed and secured in the usual manner.

By referring to Fig. 2, which is an end view of the compound shackle, it will be seen that the upper end of the link 4 is fork shaped to straddle the rear end of the main frame or the pivotal connection 6, and similarly that the upper end of the link 5 is forked to straddle the lower end of the link 4. This structure may however be reversed as occasion demand as it does not form any particular part of the present invention. The lower end of the link 4 is in this instance provided with a projecting lug 8, and this carries an adjusting screw 9 engageable with the lower side of the main frame A to permit adjustment of the link 4 with relation to the frame; the screw 9 when adjusted being locked by the nut 10 or any similar mechanism desired.

In actual operation it will be noted that the link 5 assumes a considerable angle with relation to the substantially horizontal position or arc of the leaf spring 2, and that the link 5 will assume a further inclined position, or that indicated by dotted lines at 11, when the spring compresses; for instance when subjected to a sudden shock or load. The angular position assumed by the link is of great importance as it permits free downward movement of the frame and body with relation to the spring during compression of the spring and it will at the same time check sudden upward movement or rebound of the frame with relation to the spring due to the ineffective angle assumed by the link, that is the leverage action produced by angularly disposing the link 5 as described is such that when the body or load carried by the frame is subjected to a sudden shock, for instance such as is produced when striking a chuckhole or the like, the weight will be applied at the point indicated at 7, thus tending to quickly spring the link 5 downwardly to assume the dotted line position 11. The moment the chuckhole has been passed and the pressure of the spring tends to throw the load back to normal position, it can readily be seen that the pressure of the spring is not directly applied to the frame but only through means of the link 11, and as this assumes a substantially horizontal position at the time that the full pressure of the spring is exerted thereon to return the load to normal position, a fairly slow upward movement will be imparted and not a sudden rebounding action as the entire pressure is exerted on the lower end of the link 5 and is then transmitted by lever action through the upper end of the link or the point 7. In other words the force produced by compression of the spring, which under normal conditions would cause a quick rebound action, is in this instance applied to such an ineffective manner that the rebound movement is slow and easy.

Figure 3:
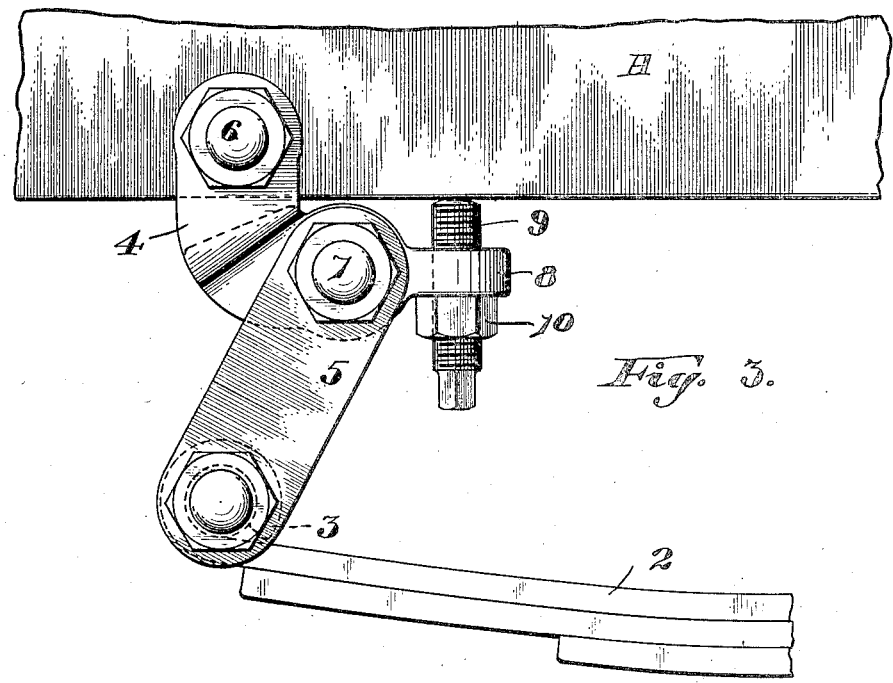
Fig. 3 is a side elevation showing the compound shackle as attached to the front spring of a motor vehicle.
Figure 4:
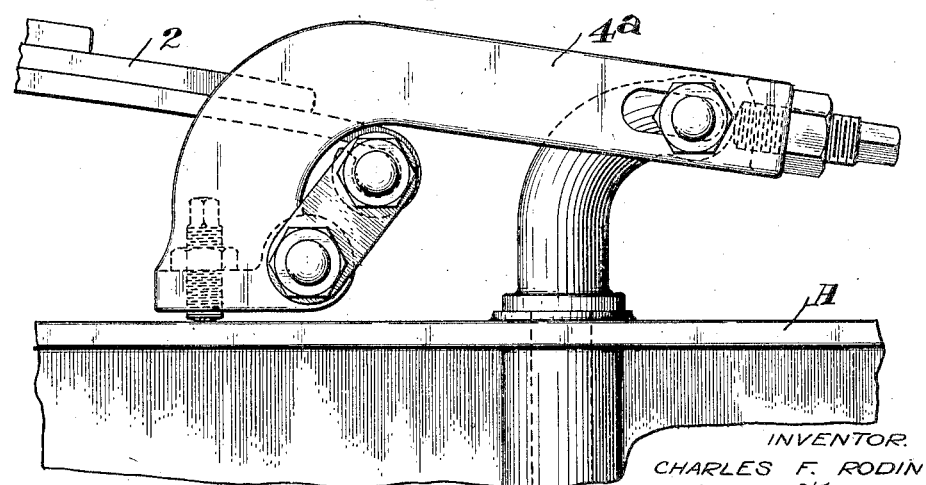

The compound shackle here illustrated may be applied to practically any type of leaf spring now in use and may be applied without altering the spring mounting or any of the parts in any way whatsoever as the only new part introduced is the link 4. This link is interposed between the old link 5 and the frame proper, and as such permits application or use of the same shackle bolts previously employed. If the springs are longitudinally disposed, or in other words placed in parallelism with the vehicle frame, links such as shown in Figs. 1 and 3 are employed; the link illustrated in Fig. 1 being placed at the rear end of the vehicle and the link illustrated in Fig. 3 at the forward end of the vehicle. If a transverse spring mounting, such as used on Ford cars or the like, is encountered, the shape of the link 4 is slightly changed as indicated at 4ᵃ in Fig. 4. The action of the spring and the links will however remain the same. With the type of link illustrated at 4 in Figs. 1 and 3, it might happen that under severe or sudden applications of load, the links 5 might have a tendency to pass beyond the horizontal position due to the flexing or straightening of the springs 2. If this is the case link 4 will come into action and will then swing about its pivot 6 in the direction of arrow $a$. This is also of importance as it permits a greater range of movement, as far as the shackle links are concerned, and it will thus take care of any load or emergency. This pivotal movement of the link 4 is of further importance as it permits adjustment of the link with relation to the frame by means of the screw 9, thus permitting increase or decrease of the normal angle assumed by the link 5 when the vehicle is remaining at rest. This adjustment permits the riding qualities of the car to be changed as the flexing of the spring 2 depends to a great extent upon the normal angular position assumed by the link 5.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. The combination with the main frame and the supporting springs of a motor vehicle, of a shackle link pivotally attached to the spring, and a second link interposed between the upper end of said first named link and the frame, said link being pivotally attached to the shackle link and also pivotally attached to the frame, said second link projecting beyond the shackle link adjacent the pivotal connection of the links and provided with an adjusting screw arranged to engage a relatively fixed portion of the vehicle to limit the movement of the said second link in one direction and normally position the same with respect to the main frame.

2. The combination with the main frame of a vehicle, and the leaf springs supporting the same, of an eye formed on one of the springs, a link pivotally attached to the main frame, a shackle link pivotally attached to the opposite end of said link at one end, and having its other end pivotally attached to the eye of the spring, and adjustable means carried by the first mentioned link and arranged to engage a relatively fixed portion of the vehicle for limiting the swing of such link in one direction and normally position the same with respect to the main frame.

3. The combination with the main frame of a vehicle, and the leaf springs supporting the same, of an eye formed on one of the springs, a link pivotally attached to the main frame, a shackle link pivotally attached to the opposite end of said link at one end and having its other end pivotally attached to the eye of the spring, a lug formed on the first named link, and an adjusting screw carried thereby and engageable with the main frame.

4. The combination with the rear end of the main frame of a vehicle, and a leaf spring disposed directly below the same, of a shackle link pivotally attached to the rear end of the leaf spring, and an offset link adapted to be interposed between the rear end of the main frame and the upper end of the shackle link, said link forming a pivotal connection between the frame and the shackle link and provided at the pivotal connection with the shackle link with a projecting portion, and an adjusting screw carried by the said projecting portion and arranged to engage a relatively fixed portion of the vehicle for limiting the swing of the offset link in one direction and for normally positioning the same with respect to the main frame.

5. The combination with the rear end of the main frame of a vehicle and a leaf spring disposed directly below the same, of a shackle link pivotally attached to the rear end of the leaf spring, an offset link adapted to be interposed between the rear end of the main frame and the upper end of the shackle link, said link forming a pivotal connection between the frame and the shackle link, and adjustable means carried by the offset link for adjusting the position of said link with relation to the main frame and the spring.

6. The combination with the rear end of the main frame of a vehicle and a leaf spring disposed directly below the same, of a shackle link pivotally attached to the rear end of the leaf spring, and an offset link adapted to be interposed between the rear end of the main frame and the upper end of the shackle link, said link forming a pivotal connection between the frame and the shackle link, said offset link being provided with projecting adjustable means arranged to engage a relatively fixed portion of the vehicle and adapted to position the shackle link so that free downward movement of the frame is permitted during compression of the spring and being at the same time so positioned as to resist upward movement of the frame during rebound action.

7. The combination with the main frame and the supporting spring of a motor vehicle, of an inclined shackle link located above and pivoted at its lower end to the end of the spring and extending upwardly and inwardly over the same between the spring and the frame, an upper link pivotally attached to the upper end of the lower link and extending upwardly and outwardly therefrom to the frame and pivoted to the latter, the pivoted ends of the links being arranged to be carried inwardly over the spring in the compression of the latter, and means carried by the upper link and arranged to engage the frame for limiting the swing of the upper link in one direction without interfering with the swinging movement of the shackle link.

8. The combination with the main frame of a motor vehicle and a leaf spring disposed below the same, of a shackle link pivotally attached to the leaf spring, and adjustable means interposed between the shackle link and the main frame and forming a pivotal connection between the same, said means adapted to change the position of the shackle link so that it will assume an angle which prevents quick rebound movement, but permits free downward movement of the frame during compression of the spring.

CHARLES F. RODIN.